(12) United States Patent
Lupien (10) Patent No.: US 11,403,307 B2
(45) Date of Patent: Aug. 2, 2022

(54) DISTRIBUTED DATA QUERY

(71) Applicant: McAfee, LLC, San Jose, CA (US)

(72) Inventor: Nicolas Lupien, Montreal (CA)

(73) Assignee: MCAFEE, LLC, San Jose, CA (US)

( * ) Notice: Subject to any disclaimer, the term of this patent is extended or adjusted under 35 U.S.C. 154(b) by 1301 days.

(21) Appl. No.: 14/864,543

(22) Filed: Sep. 24, 2015

(65) Prior Publication Data

US 2017/0091290 A1    Mar. 30, 2017

(51) Int. Cl.
| | | |
|---|---|---|
| G06F 7/00 | (2006.01) | |
| G06F 16/2458 | (2019.01) | |
| G06F 16/28 | (2019.01) | |
| G06F 16/951 | (2019.01) | |
| G06F 16/958 | (2019.01) | |

(52) U.S. Cl.
CPC ........ *G06F 16/2471* (2019.01); *G06F 16/285* (2019.01); *G06F 16/289* (2019.01); *G06F 16/951* (2019.01); *G06F 16/958* (2019.01)

(58) Field of Classification Search
CPC ......... G06F 17/30545; G06F 17/30598; G06F 17/30607; G06F 17/30864; G06F 17/3089; G06F 16/2471; G06F 16/289; G06F 16/285; G06F 16/958; G06F 16/951
USPC .................................................. 707/600–899
See application file for complete search history.

(56) References Cited

U.S. PATENT DOCUMENTS

| | | | | |
|---|---|---|---|---|
| 7,444,331 B1* | 10/2008 | Nachenberg | ........ | G06F 16/2455 |
| 8,589,366 B1* | 11/2013 | Younes | ............... | G06F 17/2247 |
| | | | | 707/705 |
| 9,436,763 B1* | 9/2016 | Gianos | ................... | G06F 16/951 |
| 2009/0198662 A1* | 8/2009 | Prabhakar | ............. | G06F 16/951 |
| 2011/0078556 A1* | 3/2011 | Prasad | .................. | G06F 21/577 |
| | | | | 715/234 |
| 2013/0024441 A1* | 1/2013 | Sun | ....................... | G06F 16/951 |
| | | | | 707/710 |

OTHER PUBLICATIONS

International Searching Authority, "International Search Report and Written Opinion," issued in connection with International Patent Application PCT/US2016/053156, dated Dec. 30, 2016, 13 pages.
Zhang, Zhiyong et al. "Profile-based focused Crawler for Social Media-Sharing Websites". 20th IEEE Internal International Conference on Tools with Artificial Intelligence 2008 pp. 317-324.

(Continued)

*Primary Examiner* — Isaac M Woo
(74) *Attorney, Agent, or Firm* — Hanley, Flight & Zimmerman, LLC (57) ABSTRACT

Performing content exploration includes obtaining an exploration script indicating page characteristics to explore and a definition of webpages to explore, locating DOMs required for exploration script based on the definition of webpages to explore, generating a queue of DOMs required for the exploration script, and distributing the DOMS in the queue of DOMS to a plurality of exploration devices. Each exploration device opens a DOM from the queue of DOMS in a web browser, executes the exploration script on the opened DOM to obtain DOM data for the opened DOM, and associates the generated DOM data with the opened DOM in a knowledge store.

15 Claims, 6 Drawing Sheets

(56) References Cited

OTHER PUBLICATIONS

Yang, Yuekui et al. "A Topic Specific Web Crawler with Web Page Hierarchy Based on HTML Dom-Tree", Asia-Pacific Conference on Information Processing 2009, pp. 420-423.
International Bureau, "International Preliminary Report on Patentability," issued in connection with International Patent Application PCT/US2016/053156, dated Apr. 5, 2018, 12 pages.

* cited by examiner

DISTRIBUTED DATA QUERY

TECHNICAL FIELD

Embodiments described herein generally relate to website exploration, and more particularly to a distributed data query.

BACKGROUND ART

Web crawlers typically provide functionality to browse and index websites from the World Wide Web. Typically, web crawlers visit websites and identify information such as hyperlinks, text, and other data that is apparent from reviewing the HyperText Markup Language (HTML) for the website. However, websites often have characteristics that may be interesting to users or developers, but are not readily apparent by reviewing the HTML of a website.

BRIEF DESCRIPTION OF DRAWINGS

FIG. 6 is a block diagram illustrating a computing device for use with techniques described herein according to another embodiment.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "network device" can refer to any computer system that is capable of communicating with another computer system across any type of network.

One of the more common modern methods of providing user credentials is via a web form presented in a web browser. Traditionally web browsers are applications that allow the user to view a representation of data presented in a specific standards-based syntax, HTML. This allows users to view web sites for a variety of uses. The front end or "head" of a web browser is its user interface. The user interface is the main point at which the user provides input to the application, and is typically a graphical user interface (GUI). The rendering of the user interface is usually provided using common application programming interfaces (APIs) provided by the display functionality of an operating system (OS) controlling the computer. This allows common appearances to be shared across applications executing under that OS, reducing code redundancy and bloat. Although described in terms of HTML and web pages, the techniques described herein can be used in any environment in which content may be injected into an object that provides a form for requesting credentials.

As used herein, a "headless" or non-rendered browser is an application that does not employ a GUI, thus, for example, a web page processed by the non-rendered browser is not rendered or displayed. The headless browser may contain the functionality to use a GUI, even though a particular invocation may not use the GUI. A non-rendered application may be invisible to the inexperienced user while executing in the system. The backend of the application remains intact, and still operable to process web site data identically as the rendered application. Headless browsers provide automated control of a web page in an environment similar to popular web browsers, but are typically executed via a command line interface or using network communication. Some headless browsers may be special purpose applications designed for such automated control purposes.

In one or more embodiments, a technique for analyzing webpage content is described. In one or more embodiments, a script is generated which indicates content characteristics for which to analyze a set of websites. Instead of analyzing the HTML of a website, embodiments use methods for interacting with objects in the documents that comprise the website. The Document Object Model (DOM) is a cross-platform and language-independent convention for representing and interacting with objects in HTML, XHTML, and XML documents. The nodes of every document are organized in a tree structure, called the DOM tree. Objects in the DOM tree may be addressed and manipulated by using methods on the objects. The public interface of a DOM is specified in its API. The World Wide Web Consortium (W3C) has published standards for DOMs, with several versions published since 1998. Embodiments described below may maintain a database or knowledge base of DOMs for use in experimentation and analysis of very large numbers of website based on their DOMs, rather than the HTML of the web pages, identifying a web of websites for analysis and extracting their corresponding DOMs from a database or knowledge base of DOMs.

The DOMs are identified for the set of websites and added to a queue. The queue is distributed among a set of servers which each access their respective DOMs in a headless browser to generate data about the DOM. Then the servers associate the data with the DOM in a database of DOMs. In one or more embodiments, the servers may store the DOMs in a cache, and pull the DOMs from the cache for a later analysis. This distributed technique thus allows analyzing the structure of multiple websites in parallel on multiple servers acting as exploratory devices, thus providing a scalable approach to website analysis.

Figure 1:
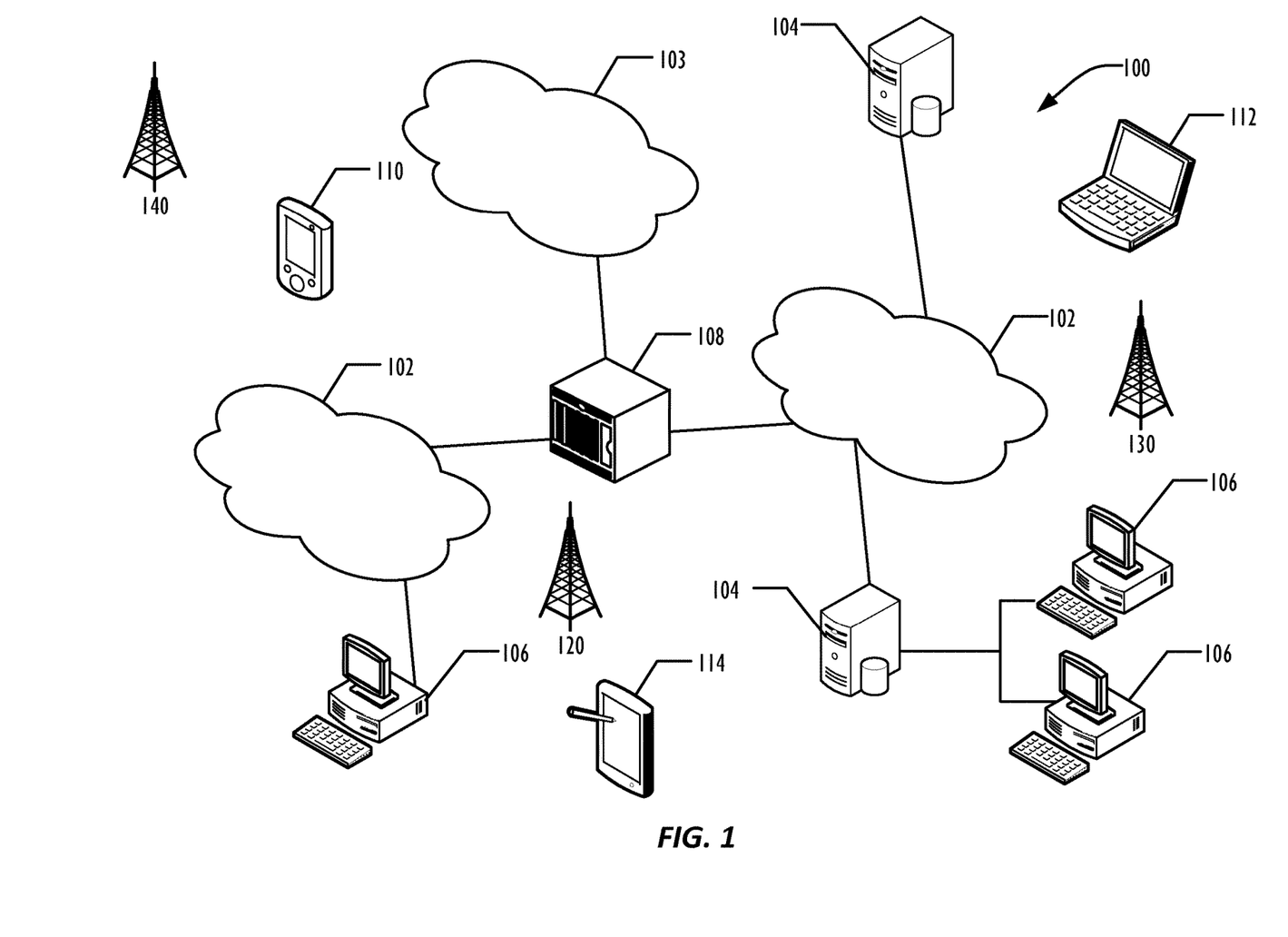
FIG. 1 is a diagram illustrating a network of programmable devices according to one or more embodiments.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

Figure 2:
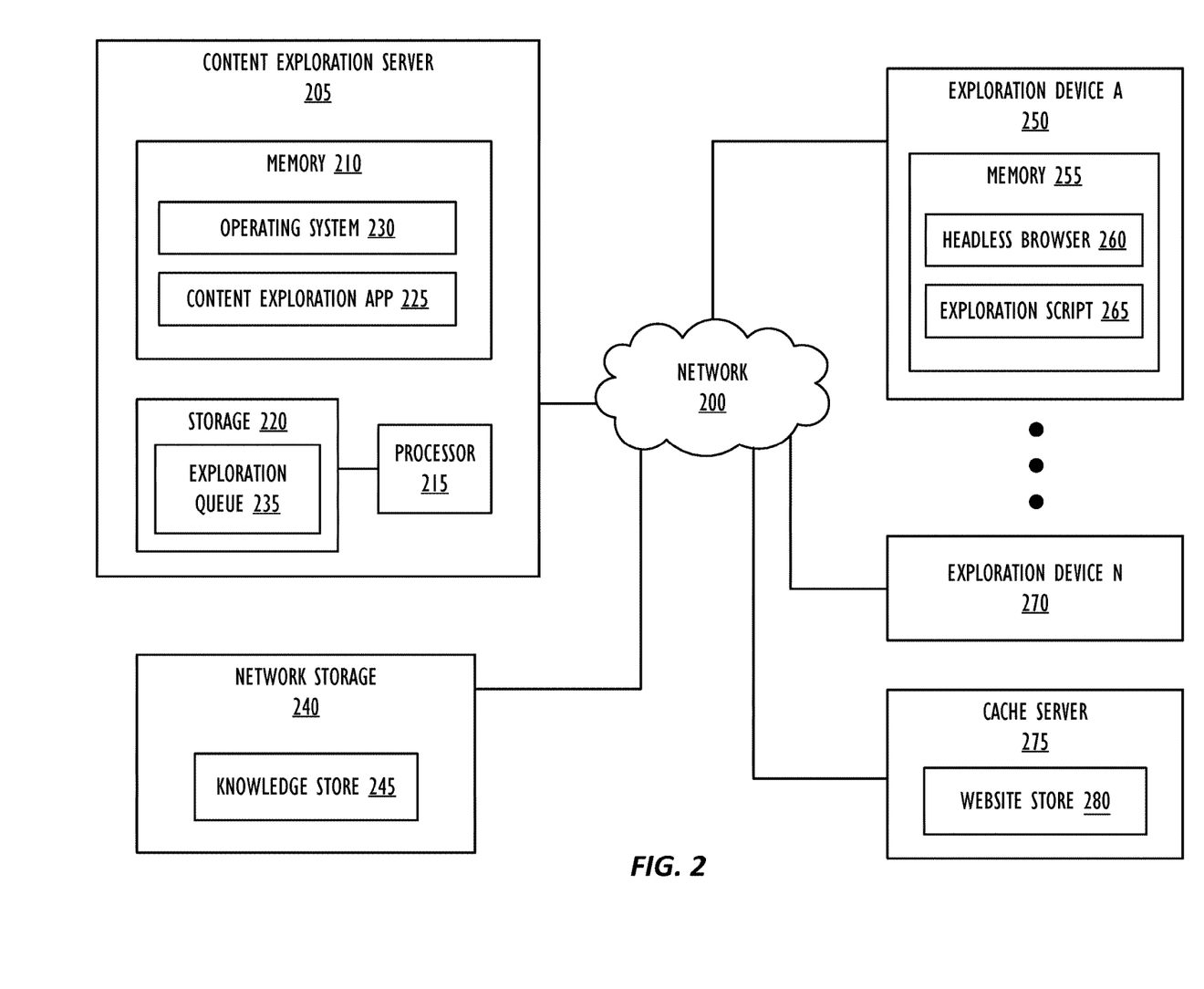
FIG. 2 is a diagram illustrating a system for providing a distributed data query according to one or more embodiments.

FIG. 2 is a diagram illustrating a system for providing a distributed data query according to one or more embodiments. FIG. 2 includes five network devices, including content exploration server 205, network storage 240, cache server 275, and exploration devices A-N 250, 270, connected across Network 200. Although five network devices are depicted, in one or more embodiments the various components and functionality of the network devices may be distributed in other ways across the network, in more or less devices, or in different combinations.

Network 200 may be any type of computer network, such as a LAN or a corporate network. For example, Network 200 may include a subset of the devices included in larger network 102 or 103. It should be understood that the components are depicted in FIG. 2 as an example embodiment, and some or all of the various components may be located, for example, within a single server, multiple servers, network storage, or other network devices.

Content Exploration Server 205 includes a processor core 215. Processor core 215 may be the core for any type of processor, such as a microprocessor, an embedded processor, a digital signal processor (DSP), a network processor, or other device to execute code. Although only one processor core is illustrated in each trusted device in FIG. 2, a processing element may alternatively include more than one of the processor core 215 illustrated in FIG. 2. Processor core 215 may each be a single-threaded core or, for at least one embodiment, processor core 215 may be multithreaded in that it may include more than one hardware thread context (or "logical processor") per core.

Content Exploration Server 205 also includes a memory coupled to the processor. Memory 210 may be any of a wide variety of memories (including various layers of memory hierarchy) as are known or otherwise available to those of skill in the art. Program code, or instructions, such as the operating system 230, and a content exploration application 225 may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible, non-transitory medium through which the program code may pass, such as antennas, optical fibers, communications interfaces, etc. Program code may be transmitted in the form of packets, serial data, parallel data, etc., and may be used in a compressed or encrypted format. The processor core 215 follow a program sequence of instructions indicated by the code. In this manner, processor core 215 is transformed during execution of the code.

Although not illustrated in FIG. 2, a processing element may include other elements on chip with the processor core 215. For example, a processing element may include memory control logic along with the processor cores. The processing element may include I/O control logic and/or may include I/O control logic integrated with memory control logic. The processing element may also include one or more caches. Content Exploration Server 205 may also include a storage 220. Storage 220 may include an exploration queue 235. In one or more embodiments, content exploration application 225 may determines websites from which to explore for various characteristics. In one or more embodiments, the websites, or DOMs for the websites, are then added to the exploration queue 235.

Exploration Device A 250 through Exploration Device N 270 include a memory, such as memory 255. Exploration Device A 250 through Exploration Device N 270 may provide a web service on the memory 255 that opens DOMs of websites in a browser 260, such as a headless browser. In one or more embodiments, the exploration script 265 may be received by the Exploration Devices 250 and 270, and run the execution script against the DOM in the headless browser to identify characteristics of the DOM. In one or more embodiments, Exploration Device A 250 through Exploration Device N 270 may run the exploration script 265 against DOMs that are stored, for example, in knowledge store 245.

In one or more embodiments, Exploration Device A 250 through Exploration Device N 270 may store the characteristics in a data store, such as knowledge store 245 in network storage 240. In one or more embodiments, knowledge store may be any data structure that includes entries of DOMs along with discovered characteristics about those DOMs.

In one or more embodiments, when Exploration Device A 250 through Exploration Device N 270 access the DOMs from the queue, they may cache a version of the DOMs, or the website for the DOMs, in a website store 280, such as that in Cache Server 275. Thus, when the exploration devices need to access the DOM again for a future exploration script, the exploration devices may simply recall the website or DOM from the cache server 275.

Figure 3:
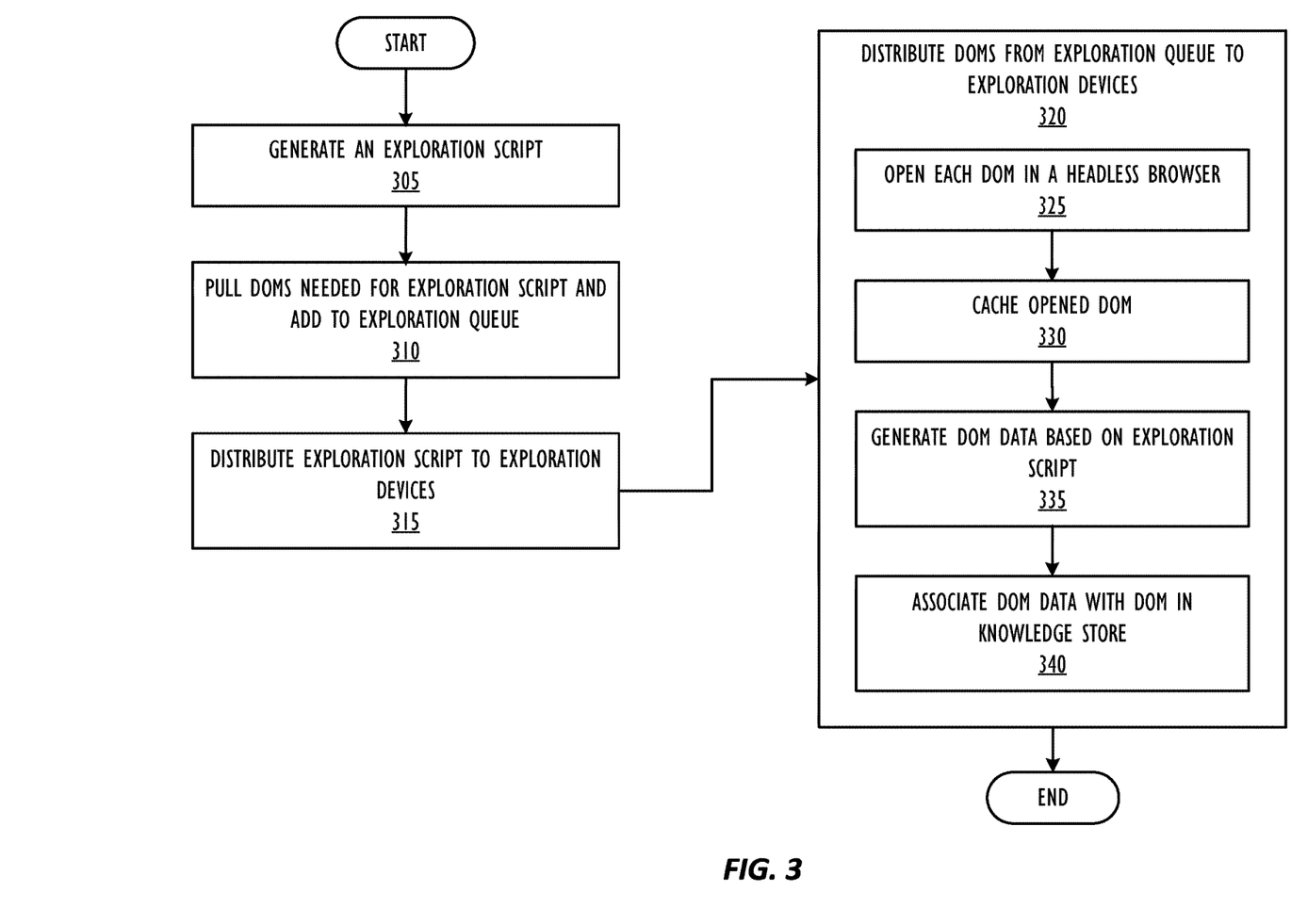
FIG. 3 is a flowchart illustrating a technique for discovering content characteristics, according to one or more embodiments.

FIG. 3 is a flowchart illustrating a technique for discovering content characteristics, according to one or more embodiments. In one or more embodiments, the various actions depicted in the flowchart may be performed in an alternative order. In addition, in one or more embodiments, some actions may be performed concurrently, or some actions may be omitted.

The flowchart begins at 305, and an exploration script is generated. In one or more embodiments, the exploration script may indicate a type of characteristic to look for in one or more websites. In one or more embodiments, the exploration script may identify characteristics to indicate a type of form on a website. For example, types of fields may indicate a type of form, thus an object in the DOM with a username field and a password field may indicate that the form is a login form. In one or more embodiments, the script may be received by content exploration application 225, or may be generated by content exploration application 225 from parameters supplied by an investigator wanting to perform an experiment or perform analysis on web sites contained in the database or knowledge base of websites.

The flowchart continues at 310 and DOMs are obtained that are needed for the exploration script. In one or more embodiments, the DOMs that need to be obtained may be determined based on a category of website that should be reviewed. For example, a user may wish to request all websites of a particular type, or from a particular geographic region or geographic location.

At 315, the exploration script is distributed to a set of exploration devices. The exploration devices may be servers distributed across a network and connected across a network to the websites, as shown in FIG. 2. In one or more embodiments distributing the exploration script to several, or many exploration devices, allows for many websites to be analyzed in a small amount of time.

At 320, the DOMs are distributed from the queue to the exploration devices, such as Exploration Device A 250 through Exploration Device N 270. In one or more embodiments, the DOMs may ordered in the queue based on a level of importance. Thus, if a particular website should be analyzed first, that website may be prioritized in the queue.

Once the exploration devices receive the DOMs from the queue, at 325, the exploration devices open each DOM in a headless browser. In one or more embodiments, the DOMs may be obtained from websites in real time, or may be obtained from a knowledge store. That is, the knowledge store may already contain some characteristics of the DOM, and may include the DOM. In one or more embodiments, opening an entire DOM in a headless browser allows the exploration devices to identify features of the website that would not normally be identifiably using a traditional HTML web crawl of the website. For example, opening the DOM in the headless browser allows for geometric data of the website to be identified, such as where a particular pixel for a particular component of the website is rendered in a website. As another example, form data, or recognition of a type of form data, may be possible by analyzing a DOM.

In one or more embodiments, at 330, the opened DOM is cached, such as in a website store 280. In one or more embodiments, caching the DOM allows the exploration devices to retrieve the DOM from the cache at a later time, which will be explained in greater detail below with respect to FIG. 4.

At 335, DOM data is generated based on the exploration script. In one or more embodiments, the DOM data may include characteristics identified in the DOM. For example, if the DOM includes a form, the DOM data may include a type of form identified based on the components of the form.

At 340, the DOM data is associated with the DOM in a knowledge store. In one or more embodiments, the knowledge store may include copies of the DOM as well as characteristics about that DOM. For example, if that DOM includes a form, the knowledge store may also include an entry for that DOM that indicates that the DOM is a particular type of form, such as a login page or a signup page.

Figure 4:
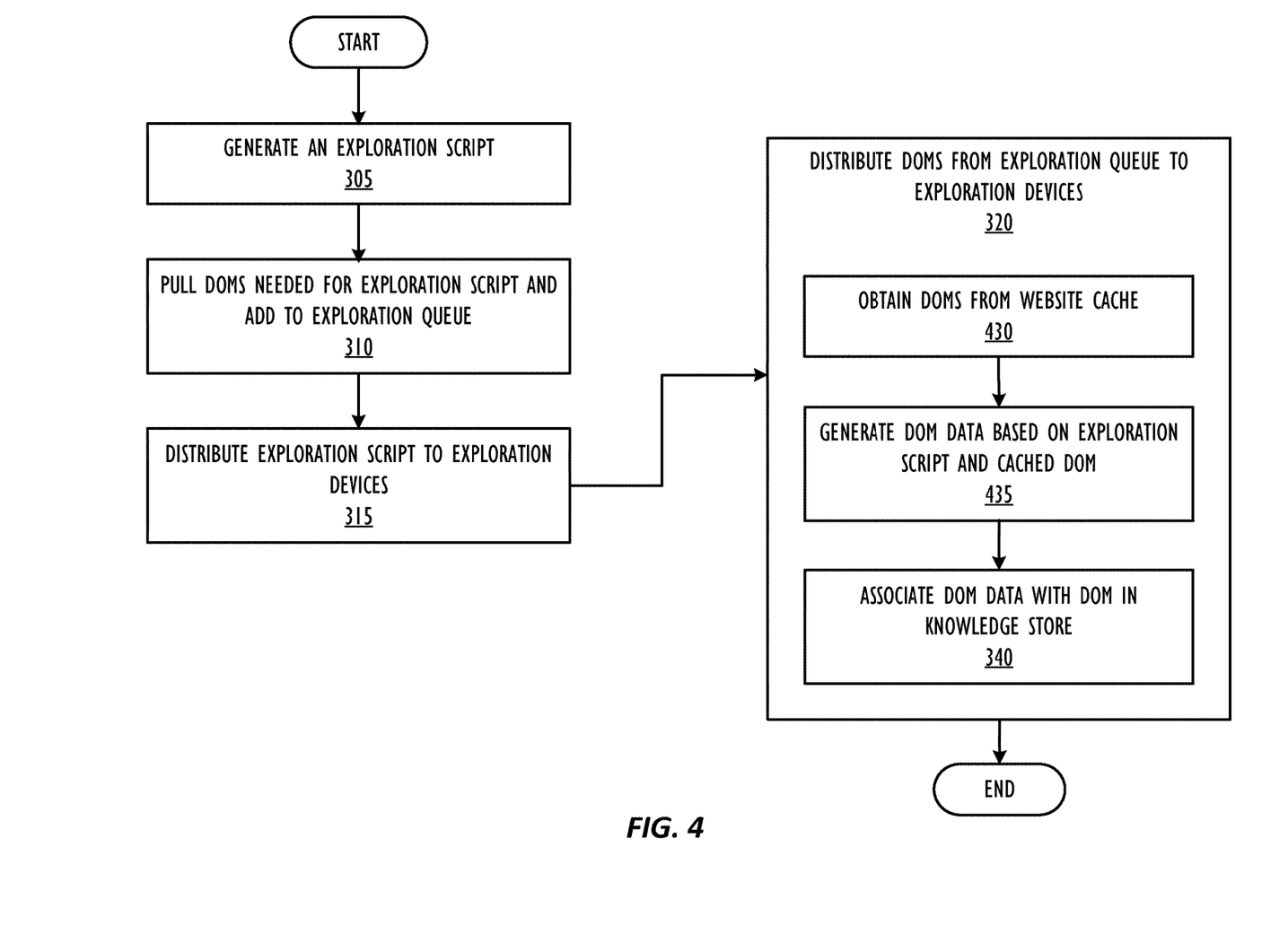
FIG. 4 is a flowchart illustrating a technique for discovering content characteristics from cached data, according to one or more embodiments.

FIG. 4 is a flowchart illustrating a technique for discovering content characteristics from cached data, according to one or more embodiments. FIG. 4 shows many of the same steps depicted in FIG. 3. The distinction in FIG. 4 is that in some embodiments, once the exploration devices receive DOMs off the queue, at 425, the DOMs are obtained from a cache at 430. At 435, DOM data is generated based on the exploration script and the cached DOMs. Then, as in FIG. 3, at 340, the DOM data is associated with the DOM in a knowledge store.

Figure 5:
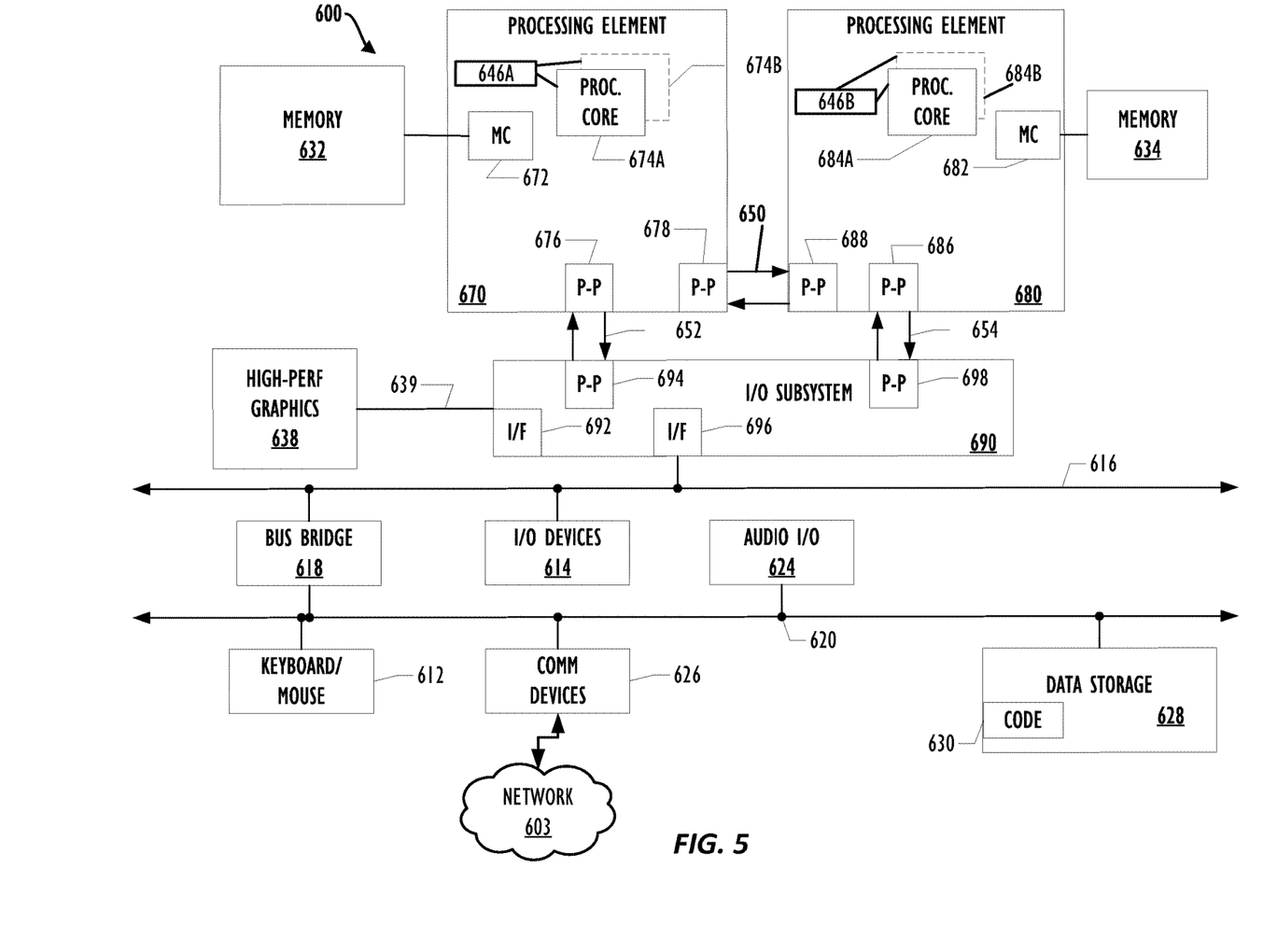
FIG. 5 is a diagram illustrating a computing device for use with techniques described herein according to one embodiment.

Referring now to FIG. 5, a block diagram illustrates a programmable device 600 that may be used within a computer device, in accordance with one or more embodiments. The programmable device 600 illustrated in FIG. 5 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 5 may be implemented as a multi-drop bus rather than point-to-point interconnects.

As illustrated in FIG. 5, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-4. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 5, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 5, various I/O devices 614, 624 may be coupled to first link 616, along with a bridge 618, which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 5, a system may implement a multi-drop bus or another such communication topology. Although links 616 and 620 are illustrated as busses in FIG. 5, any desired type of link may be used. Also, the elements of FIG. 5 may alternatively be partitioned using more or fewer integrated chips than illustrated in FIG. 5.

Referring now to FIG. 6, a block diagram illustrates a programmable device 700 according to another embodiment. Certain aspects of FIG. 5 have been omitted from FIG. 6 in order to avoid obscuring other aspects of FIG. 6.

FIG. 6 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 6 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 6 as processor cores 774A, 774B, 784A, and 784B. As illustrated in FIG. 7, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 5 and 6 are schematic illustrations of embodiments of programmable devices that may be utilized to implement various embodiments discussed herein. Various components of the programmable devices depicted in FIGS. 5 and 6 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed cause a machine to: open a document object model (DOM) from a queue of DOMS in a web browser, the queue of DOMs comprising DOMs required for an exploration script indicating page characteristics to explore and a definition of webpages to explore; execute the exploration script on the opened DOM to generate DOM data for the opened DOM; and associate the generated DOM data with the opened DOM in a knowledge store.

In Example 2 the subject matter of Example 1 optionally includes wherein the generated DOM data comprises characteristics of the opened DOM not identifiable by HTML of a webpage of the DOM.

In Example 3 the subject matter of Example 1 optionally includes wherein the generated DOM data comprises geometric characteristics of a rendered version of the opened DOM.

In Example 4 the subject matter of Example 1 optionally includes wherein the generated DOM data comprises form data.

In Example 5 the subject matter of Examples 1-4 optionally includes wherein the web browser is a headless web browser.

In Example 6 the subject matter of Examples 1-4 optionally includes wherein the instructions further comprise instructions that when executed cause the machine to: locate a cached version of the DOM in a website cache; and execute the exploration script on the cached version of the DOM.

In Example 7 the subject matter of Examples 1-4 optionally includes wherein the definition of web pages to explore identifies webpages by geographic location.

Example 8 is a system, comprising: one or more processors; and a memory, coupled to the one or more processors, on which are stored instructions, comprising instructions that when executed cause at least some of the one or more processors to: obtain an exploration script indicating page characteristics to explore and a definition of webpages to explore; locate document object models (DOMs) required for the exploration script based on the definition of webpages to explore; generate a queue of DOMs required for the exploration script; and distribute the DOMS in the queue of DOMS to a plurality of exploration devices, wherein each exploration device is configured to: open a DOM from the queue of DOMS in a web browser; execute the exploration script on the opened DOM to generate DOM data for the opened DOM; and associate the generated DOM data with the opened DOM in a knowledge store.

In Example 9 the subject matter of Example 8 optionally includes wherein the generated DOM data comprises characteristics of the DOM not identifiable by HTML of a webpage of the DOM.

In Example 10 the subject matter of Example 8 optionally includes wherein the generated DOM data comprises geometric characteristics of a rendered version of the DOM.

In Example 11 the subject matter of Example 8 optionally includes wherein the generated DOM data comprises form data.

In Example 12 the subject matter of Examples 8-11 optionally includes wherein the web browser is a headless web browser.

In Example 13 the subject matter of Examples 8-11 optionally includes wherein at least one of the plurality of exploration devices is configured to open a DOM from the queue of DOMs by: locating a cached version of the DOM in a website cache; and executing the exploration script on the cached version of the DOM.

Example 14 is a method comprising: obtaining an exploration script indicating page characteristics to explore and a definition of webpages to explore; locating document object models (DOMs) required for the exploration script based on the definition of webpages to explore; generating a queue of DOMs required for the exploration script; and distributing the DOMS in the queue of DOMS to a plurality of exploration devices, wherein each exploration device: opens a DOM from the queue of DOMS in a web browser; executes the exploration script on the opened DOM to generate DOM data for the opened DOM; and associates the generated DOM data with the opened DOM in a knowledge store.

In Example 15 the subject matter of Example 14 optionally includes wherein the generated DOM data comprises characteristics of the DOM not identifiable by HTML of a webpage of the DOM.

In Example 16 the subject matter of Example 14 optionally includes wherein the generated DOM data comprises geometric characteristics of a rendered version of the DOM.

In Example 17 the subject matter of Example 14 optionally includes wherein the generated DOM data comprises form data.

In Example 18 the subject matter of Example 14 optionally includes wherein the web browser is a headless web browser.

In Example 19 the subject matter of Examples 14-18 optionally includes wherein at least one of the plurality of exploration devices opens a DOM from the queue of DOMs by: locating a cached version of the DOM in a website cache; and executes the exploration script on the cached version of the DOM.

In Example 20 the subject matter of Examples 14-18 optionally includes wherein the definition of web pages to explore identifies webpages by geographic location.

Example 21 is a programmable device, comprising: one or more processors; and a memory, on which are stored instructions, comprising instructions that when executed cause at least some of the one or more processor to: open a document object model (DOM) from a queue of DOMS in a web browser, the queue of DOMs comprising DOMs required for an exploration script indicating page characteristics to explore and a definition of webpages to explore; execute the exploration script on the opened DOM to generate DOM data for the opened DOM; and associate the generated DOM data with the opened DOM in a knowledge store.

In Example 22 the subject matter of Example 21 optionally includes wherein the generated DOM data comprises characteristics of the opened DOM not identifiable by HTML of a webpage of the DOM.

In Example 23 the subject matter of Example 21 optionally includes wherein the generated DOM data comprises geometric characteristics of a rendered version of the opened DOM.

In Example 24 the subject matter of Example 21 optionally includes wherein the generated DOM data comprises form data.

In Example 25 the subject matter of Examples 21-24 optionally includes wherein the web browser is a headless web browser.

In Example 26 the subject matter of Examples 21-24 optionally includes wherein the instructions further comprise instructions that when executed cause at least some of the processors to: locate a cached version of the DOM in a website cache; and execute the exploration script on the cached version of the DOM.

In Example 27 the subject matter of Examples 21-24 optionally includes wherein the definition of web pages to explore identifies webpages by geographic location.

Example 28 is a machine readable medium on which instructions are stored, comprising instructions that when executed cause a machine to: opens a document object model (DOM) from a queue of DOMS in a headless browser, the queue of DOMs comprising DOMs required for an exploration script indicating page characteristics to explore and a definition of webpages to explore; executes the exploration script on the opened DOM to generate DOM data for the opened DOM; and associates the generated DOM data with the opened DOM in a knowledge store.

In Example 29 the subject matter of Example 28 optionally includes wherein the generated DOM data comprises characteristics of the opened DOM not identifiable by HTML of a webpage of the DOM.

In Example 30 the subject matter of Example 28 optionally includes wherein the generated DOM data comprises geometric characteristics of a rendered version of the opened DOM.

In Example 31 the subject matter of Example 28 optionally includes wherein the generated DOM data comprises form data.

In Example 32 the subject matter of Examples 28-31 optionally includes wherein the instructions further comprise instructions that when executed cause the machine to: locate a cached version of the DOM in a website cache; and execute the exploration script on the cached version of the DOM.

In Example 33 the subject matter of Examples 28-31 optionally includes wherein the definition of web pages to explore identifies webpages by geographic location.

Example 34 is a system, comprising: one or more processors; and a memory, coupled to the one or more processors, on which are stored instructions, comprising instructions that when executed cause at least some of the one or more processors to: obtain an exploration script indicating page characteristics to explore and a definition of webpages to explore; locate document object models (DOMs) required for the exploration script based on the definition of webpages to explore; generate a queue of DOMs required for the exploration script; and distribute the DOMS in the queue of DOMS to a plurality of exploration devices, wherein each exploration device is configured to: open a DOM from the queue of DOMS in a headless browser; execute the exploration script on the opened DOM to generate DOM data for the opened DOM; and associate the generated DOM data with the opened DOM in a knowledge store.

In Example 35 the subject matter of Example 34 optionally includes wherein the generated DOM data comprises geometric characteristics of a rendered version of the DOM.

In Example 36 the subject matter of Example 34 optionally includes wherein the generated DOM data comprises form data.

In Example 37 the subject matter of Examples 34-36 optionally includes wherein at least one of the plurality of exploration devices is configured to open a DOM from the queue of DOMs by: locating a cached version of the DOM in a website cache; and executing the exploration script on the cached version of the DOM.

Example 38 is a method comprising: obtaining an exploration script indicating page characteristics to explore and a definition of webpages to explore; locating document object models (DOMs) required for the exploration script based on the definition of webpages to explore; generating a queue of DOMs required for the exploration script; and distributing the DOMS in the queue of DOMS to a plurality of exploration devices, wherein each exploration device: opens a DOM from the queue of DOMS in a headless browser; executes the exploration script on the opened DOM to generate DOM data for the opened DOM; and associates the generated DOM data with the opened DOM in a knowledge store.

In Example 39 the subject matter of Example 38 optionally includes wherein the generated DOM data comprises characteristics of the DOM not identifiable by HTML of a webpage of the DOM.

In Example 40 the subject matter of Example 38 optionally includes wherein the generated DOM data comprises geometric characteristics of a rendered version of the DOM.

In Example 41 the subject matter of Example 38 optionally includes wherein the generated DOM data comprises form data.

In Example 42 the subject matter of Examples 38-41 optionally includes wherein at least one of the plurality of exploration devices opens a DOM from the queue of DOMs by: locating a cached version of the DOM in a website cache; and executes the exploration script on the cached version of the DOM.

It is to be understood that the above description is intended to be illustrative, and not restrictive. For example, the above-described embodiments may be used in combination with each other. As another example, the above-described flowcharts include a series of actions, which may not be performed in the particular order depicted in the drawings. Rather, the various actions may occur in a different order, or even simultaneously. In addition, in some embodiments, some actions may not be performed. Many other embodiment will be apparent to those of skill in the art upon reviewing the above description. The scope of the invention should therefore should be determined with reference to the appended claims, along with the full scope of equivalents to which such claims are entitled.

What is claimed is:

1. A storage disk or storage device comprising instructions that, when executed, cause a server to at least:
    select a website based on a category, the category based on a geographic location associated with the website;
    generate an exploration script based on a characteristic of interest for the website, the exploration script to identify the characteristic that is associated with the category, the exploration script to be executed by two or more exploration devices in parallel to reduce a time to generate document object model (DOM) data for the website, the DOM data based on the characteristic, the characteristic corresponding to a geometric characteristic of a rendered version of a DOM;
    transmit the exploration script to the two or more exploration devices;
    obtain the DOM data from the two or more exploration devices, the DOM data to be generated by each of the two or more exploration devices, in parallel, by:
        locating a cached version of a respective DOM in a corresponding website cache;
        opening the cached version of the DOM in a headless web browser;
        executing the exploration script on the DOM with a respective one of the two or more exploration devices; and
        in response to identifying the characteristic, generating the DOM data; and
    facilitate association of the DOM data with the website.

2. The storage disk or storage device of claim 1, wherein the characteristic is not identifiable PA based on an examination of HTML of the website.

3. The storage disk or storage device of claim 1, wherein the instructions, when executed, cause the server to generate the exploration script to cause the two or more exploration devices to identify a type of form on the website, the DOM data including form data, the form data representative of at least one of a username field or a password field of a login form.

4. The storage disk or storage device of claim 1, wherein the characteristic corresponds to at least one of a username field or a password field.

5. The storage disk or storage device of claim 1, wherein the two or more exploration devices include a first exploration device and a second exploration device, the first exploration device and the second exploration device are separate exploration devices, and the instructions, when executed, cause the server to generate the exploration script to:
    cause the first exploration device to transmit a first portion of the DOM data to a datastore;
    cause the second exploration device to transmit a second portion of the DOM data to the datastore; and
    cause the server to obtain the DOM data from the datastore via a network.

6. A server comprising:
at least one memory;
instructions; and
one or more processors to execute the instructions to:
   select websites based on a category, the category based on a geographic location associated with the websites;
   generate an exploration script based on a characteristic of interest for the websites, the exploration script to identify the characteristic, the characteristic associated with the category, the exploration script to be executed by two or more exploration devices in parallel to reduce a time to generate document object model (DOM) data for the websites, the websites including a first website and a second website, the two or more exploration devices including a first exploration device and a second exploration device, the DOM data based on the characteristic, the characteristic corresponding to a geometric characteristic of a rendered version of a DOM;
   transmit the exploration script to the first and second exploration devices;
   obtain the DOM data from the first and second exploration devices, a first portion of the DOM data to be generated by the first exploration device, in parallel with the second exploration device generating a second portion of the DOM data, by:
      locating a cached version of a first DOM in a first website cache;
      opening the first DOM from the first website in a first headless web browser; and
      executing the exploration script on the first DOM;
   the second portion of the DOM data to be generated by the second exploration device, in parallel with the first exploration device generating the first portion of the DOM data, by:
      locating a cached version of a second DOM in a second website cache;
      opening the second DOM from the second website in a second headless web browser; and
      executing the exploration script on the second DOM; and
   facilitate association of the DOM data with at least one of the first website or the second website.

7. The server of claim 6, wherein the characteristic is not identifiable based on an examination of HTML of the first and the second websites.

8. The server of claim 6, wherein the server is to generate the exploration script to cause at least one of the first exploration device or the second exploration device to respectively identify a type of form on the first or second websites, the DOM data including form data, the form data representative of at least one of a username field or a password field of a login form.

9. The server of claim 6, wherein the characteristic corresponds to at least one of a username field or a password field.

10. The server of claim 6, wherein the first exploration device and the second exploration device are separate exploration devices, and the one or more processors are to generate the exploration script to:
   cause the first exploration device to transmit the first portion of the DOM data to a datastore;
   cause the second exploration device to transmit the second portion of the DOM data to the datastore; and
   cause the one or more processors to obtain the first and second portions of the DOM data from the datastore via a network.

11. A method comprising:
   selecting websites based on a category, the category based on a geographic location associated with the websites;
   generating an exploration script based on a characteristic of interest for the websites, the exploration script to identify the characteristic, the characteristic associated with the category, the exploration script to be executed by two or more exploration devices in overlapping time periods to reduce a time to generate document object model (DOM) data for the websites, the websites including a first website and a second website, the two or more exploration devices including a first exploration device and a second exploration device, the DOM data based on the characteristic, the characteristic corresponding to a geometric characteristic of a rendered version of a DOM;
   in response to transmitting the exploration script to the first and second exploration devices, obtaining the DOM data from the first and second exploration devices, a first portion of the DOM data to be generated by the first exploration device, in parallel with the second exploration device generating a second portion of the DOM data, by:
      locating a cached version of a first DOM in a first website cache;
      opening the first DOM from the first website in a headless web browser; and
      executing the exploration script on the first DOM;
   the second portion of the DOM data to be generated by the second exploration device, in parallel with the first exploration device generating the first portion of the DOM data, by:
      locating a cached version of a second DOM in a second website cache;
      opening the second DOM from the second website in a second headless web browser; and
      executing the exploration script on the second DOM; and
   facilitating association of the DOM data with at least one of the first website or the second website.

12. The method of claim 11, wherein the characteristic is not identifiable PA based on an examination of HTML of at least one of the first website or the second website.

13. The method of claim 11, wherein the exploration script is to cause the at least one of the first exploration device or the second exploration device to respectively identify a type of form on the first or second websites, the DOM data including form data, the form data representative of at least one of a username field or a password field of a login form.

14. The method of claim 11, wherein the characteristic corresponds to at least one of a username field or a password field.

15. The method of claim 11, wherein the first exploration device and the second exploration device are separate exploration devices, and further including:
   transmitting, with the first exploration device, the first portion of the DOM data to a datastore;
   transmitting, with the second exploration device, the second portion of the DOM data to the datastore; and
   obtaining the first and second portions of the DOM data from the datastore via a network.

* * * * *